United States Patent [19]

McKechnie

[11] Patent Number: 4,672,458

[45] Date of Patent: Jun. 9, 1987

[54] PROJECTION TELEVISION SYSTEMS HAVING LENS TILT COMPENSATION MEMBER

[75] Inventor: Thomas S. McKechnie, Ossining, N.Y.

[73] Assignee: North American Philips Corporation, New York, N.Y.

[21] Appl. No.: 687,113

[22] Filed: Dec. 28, 1984

[51] Int. Cl.[4] .............................................. H04N 5/74
[52] U.S. Cl. .................................. 358/237; 358/231; 350/571
[58] Field of Search ............... 358/231, 237, 248, 249, 358/60, 64, 238, 239; 350/571

[56] References Cited

U.S. PATENT DOCUMENTS

| | | | |
|---|---|---|---|
| 3,972,584 | 8/1976 | Lobb | 350/571 |
| 3,985,422 | 10/1976 | Mecklenborg et al. | 350/571 |
| 4,151,554 | 4/1979 | Tucker | 358/64 X |
| 4,274,110 | 6/1981 | Lehnert | 358/237 X |
| 4,404,588 | 9/1983 | Fanizza et al. | 358/60 |
| 4,563,699 | 1/1986 | Watanabe et al. | 358/60 |

FOREIGN PATENT DOCUMENTS 0191580 11/1983 Japan ................................. 358/231

Primary Examiner—James J. Groody
Assistant Examiner—Victor R. Kostak
Attorney, Agent, or Firm—F. Brice Faller

[57] ABSTRACT

A projection television system includes a planar projection screen, a CRT for producing a phosphor image, and a lens assembly for focusing the phosphor image onto the projection screen. The lens assembly is arranged such that its optical axis is skewed with respect to an axis normal to the projection screen. The system further includes a correction member on which the CRT and the lens assembly are fixed so that a planar outside surface of the CRT is oriented at the Scheimpflug angle with respect to a flat rear optical surface of the lens assembly. In a preferred embodiment, the correction member is integral with rear element of the lens assembly.

7 Claims, 3 Drawing Figures

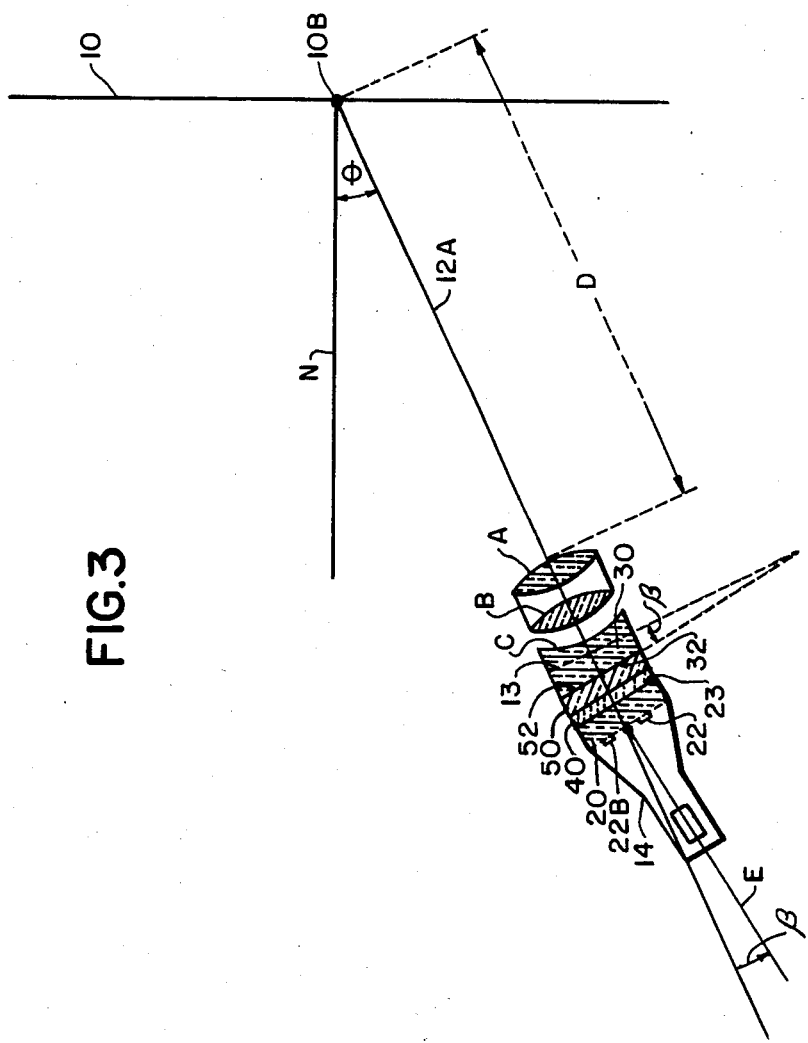

PROJECTION TELEVISION SYSTEMS HAVING LENS TILT COMPENSATION MEMBER

BACKGROUND OF THE INVENTION

1. Field of the Invention

The present invention relates to television, and more particularly to projection television (TV) systems in which at least one cathode-ray tube (CRT) and an associated lens assembly, together, project a phosphor image of the CRT onto a remote generally planar projection screen to provide a greatly enlarged image.

2. Description of the Prior Art

Present day commercial projection television systems (e.g. rear screen projection TV systems) typically include three different monochrome CRTs which, in combination with their respective lens assemblies, project phosphor images in the three primary colors onto a generally planar projection screen suitably spaced from the lens assemblies. A monochrome CRT includes an electron gun for generating an electron beam and for defining an electron beam axis. The CRT also includes a front portion having an inside screen surface on which an appropriate phosphor screen is located, and also having an outside surface. The inside and outside surfaces are typically planar and are oriented at right angles to the electron beam axis; the electron beam axis passes through a center point of the phosphor screen. During operation of the CRT, the electron beam impinges upon the phosphor screen to produce a primary color phosphor image. The outside surface may include a planar outside surface of a faceplate of the CRT.

The CRT may be liquid cooled in which case the front portion includes a containment plate spaced from the faceplate to form a channel between them, and a transparent cooling liquid filling the channel. The outside surface then includes a planar outside surface of the containment plate. During normal operation of the liquid cooled CRT, the liquid removes unwanted heat from the area of the faceplate. Such liquid cooled tubes are available commercially.

A lens assembly associated with the CRT typically includes a generally flat rear optical surface which is oriented perpendicularly to an optical axis of the lens. The rear optical surface is typically the rear surface of a field flattener element of the assembly. The assembly is located near the CRT outside surface and arranged such that the assembly and the CRT, together, project the phosphor image onto the projection screen.

In commercial rear screen projection TV systems, the three tubes are usually arranged in an "in-line" configuration in which one of the tubes (e.g. green image tube) is located such that its electron beam axis is collinear with its associated optical axis. The optical axis of the lens assembly associated with the green tube passes through a central location of and is normal to a projection surface of the projection screen. The other two tubes (red, blue image tubes) are located off-axis on either side of the normal axis. The electron beam and optical axes of the three tubes lie in a common plane. The respective focusing lenses of the off-axis tubes are skewed (i.e. tilted) so that their respective optical axes converge on the central location of the screen projection surface. These optical axes each make an equal first acute angle (e.g. in a range from 5° to 11°) with respect to the normal axis. The lens assemblies have equal magnifications (e.g. in a range from 7 to 10) and are each spaced an equal optical distance (e.g. in a range from 38" to 53") from the screen projection surface. The electron beam axes of the off-axis tubes also may be collinear with their respective optical axes. However, the focused image planes of the projected red and blue images will not register with the screen projection surface.

In order to register the focused image planes of the phosphor images projected through the off-axis lenses with the screen projection surface, each off-axis tube's phosphor image is rotated relative to the rear optical surface of its associated focusing lens assembly. More specifically, the electron beam axis of the blue image CRT is rotated counterclockwise through a second acute angle and, similarly, the red image CRT is rotated clockwise through essentially the same second acute angle so that each electron beam axis intersects its respective optical axis at the angle of rotation. In other words, for each combination of an off-axis CRT and an off-axis lens assembly, the planes of the CRT outside and the lens rear surfaces intersect at the angle of rotation.

As is well known in the optical art, this angle of rotation (Scheimpflug angle $\beta$) is essentially equal to $n\theta/M$, wherein $\theta$ is the degree angle between the normal axis of the projection screen and the optical axis of a skewed lens assembly, n is the refractive index of the optical medium disposed between the CRT outside surface and the rear surface of the lens, and M is the numerical magnification of the lens.

Because of fast lenses (e.g. F/1 lens) now often used in projection TV systems, any misregistration of the focused projected-image planes with the screen projection surface is particularly noticeable. It is almost a system design requirement that the Scheimpflug angle be achieved and maintained to within one arc minute in a typical rear screen projection TV system. Therefore, accurately achieving and reliably maintaining the Scheimpflug angle between the CRT and the lens assembly is more critical than in the past.

Prior art arrangements for achieving and maintaining the scheimpflug angle between the CRT and the lens assembly include various holding assemblies such as brackets and the like for orienting the CRT outside surface at the scheimpflug angle with respect to the lens rear surface. A fluid medium (e.g. air, $n \approx 1$) is present between the CRT outside surface and the lens rear surface.

These prior art arrangements have drawbacks because they are complicated and expensive to employ, and also because focused image plane misregistration at the screen projection surface is still observed.

SUMMARY OF THE INVENTION

It is the principal object of the present invention to overcome the drawbacks of the prior art.

It is a further object of the present invention to provide a projection television system in which the scheimpflug angle is precisely achieved and reliably maintained.

A projection system according to the present invention includes a tilt correction (compensation) member having a source means locating surface and a lens means locating surface. The locating surfaces have suitable dimensions, are planar and are oriented such that the surface planes intersect at the scheimpflug angle of the system. The CRT outside surface is fixed on the source means locating surface and the lens rear optical surface is fixed on the lens means locating surface so that the CRT outside and the lens rear surface planes intersect at the Scheimpflug angle.

The correction member must be solid (i.e. without cavities) and must be formed of a transparent hard material having a compositions such that the correct orientation of the locating surfaces is easily achieved during manufacture of the member and reliably maintained during its use. The member should also have an essentially uniform refractive index (preferably approximately equal to that of the lens rear surface) within its geometrical boundaries. A hard (i.e. rigid) transparent material such as a glass or a suitable plastic (e.g. acrylic) is particularly desirable for the member. These transparent materials are easily shaped (e.g. molded), machined and are suitably hard.

The member may be fixed on the rear surface of the lens by a thin layer of a suitable optical adhesive (e.g. optical cement) or, alternatively, may be formed integrally with the rear surface of the lens.

The CRT outside surface may also be fixed on the appropriate surface of the member by a thin layer of an optical adhesive. Alternatively, the CRT may be fixed on the member by any suitable holding arrangement. For example, such an arrangement may include retaining arms of a suitable length and configuration so that the CRT and the lens assembly can sandwich and retain the member between them. The arms may be pivotally mounted to flanges fixedly provided on the tube envelope. Each retaining arm may be provided with a threaded tightening screw (e.g. thumbscrew) at its end opposite the pivot end. Slotted receivers may be fixed to a housing of the lens assembly. The slotted receivers are arranged for cooperation with respective screws so that tightening the screws fixes the CRT to the lens housing and, thus, fixes the CRT outside surface on the source means locating surface of the member.

See, for example, U.S. Pat. No. 4,404,588, which teaches an arrangement for fixing a CRT to a lens assembly in a projection TV system.

Further and still other objects of the present invention will become more readily apparent when taken in conjunction with the accompanying drawing figures.

BRIEF DESCRIPTION OF THE DRAWING

FIG. 3 is a schematic top view, partly in section, of an alternative embodiment of the inventive system including a conventional liquid cooled CRT fixed on a lens assembly having a rear optical element formed unitarily with a correction member.

DESCRIPTION OF THE PREFERRED EMBODIMENTS

Figure 1:
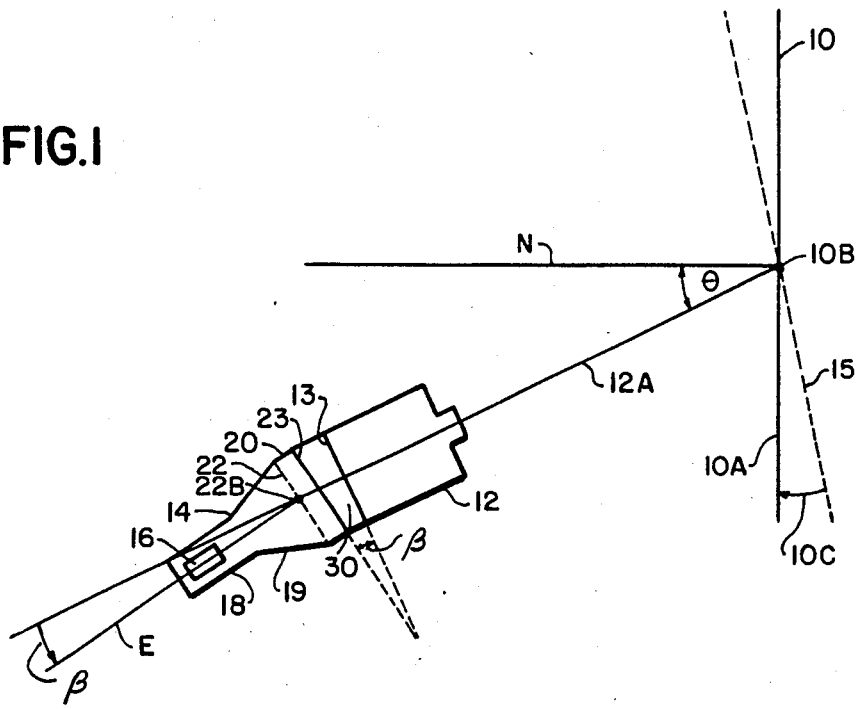
FIG. 1 is a schematic top plan view of a projection TV system of the instant invention including a transparent correction member.

FIG. 1 shows the basic geometry of a projection TV system of the present invention. A monochrome phosphor image in a primary color (e.g. blue) is projected onto a projection screen 10 by means of a focusing lens assembly 12 associated with a cathode-ray tube 14. Tube 14 may be a blue image monochrome CRT which is of a conventional projection TV type. Such a CRT includes a neck 18 in which an electron gun 16 is disposed. The gun 16 defines an electron beam axis E. The neck 18 is connected to a funnel 19 which is connected to a front portion. The front portion includes a faceplate 20 having a planar inside surface on which is located on a phosphor screen 22 luminescent at the desired wavelength, and also having a planar outside surface 23. The screen 22 and the surface 23 are oriented perpendicularly to the beam axis E. The axis E passes through a center point 22B of the screen 22.

Projection screen 10 includes a planar projection surface 10A defining a normal optical axis N which is perpendicular to the surface 10A and which passes through a center point 10B of the screen surface 10A.

Lens assembly 12 defines an optical axis 12A. The assembly 12 is arranged such that the axis 12A also passes through the center point 10B of the screen surface 10A. Electron beam axis E and lens axis 12A lie in a common plane containing the normal axis N.

Lens 12 is further arranged such that the optical axis 12A is off-set to the right of the normal axis N. Thus, lens 12 is skewed so that the optical axis 12A makes a first acute angle $\theta$ with respect to the normal axis N. The acute angle $\theta$, typically, is in a range of between 5° to 11° with 7.8° being a usual value.

The center point 10B of the projection surface 10A and the center point 22B of the phosphor screen 22 should be located at conjugate points of the lens assembly 12. The conjugate points 10B, 22B are governed generally by a well known relationship which depends upon the focal length (f) of the lens assembly 12. Generally, $1/f = 1/s + 1/s'$ wherein f is the focal length of the lens assembly, s is an object (e.g. phosphor image) plane distance (i.e. distance from optical center of assembly 12 to point 22B along axis 12A) and s' is a projected image plane distance (i.e. distance from optical center of assembly 12 to point 10B along axis 12A). Of course, the distances s, s' take into account (i.e. will vary with) the optical media present at opposite sides of the lens assembly 12 along the axis 12A. Locating the center point 22B of the phosphor screen and the center point 10B of the projection screen surface at suitable conjugate points causes a focused image plane 15 of a projected phosphor image to pass through the center point 10B. Because locating the center points 10B, 22B at suitable conjugate points is well understood by those skilled in the projection TV art, it will not be further discussed.

In order to register the focused image plane 15 of a projected image with the projection surface 10A, the CRT 14 is rotated, in this case, counterclockwise so that the electron beam axis E and the optical axis 12A intersect at the Scheimpflug angle ($\beta$) of the system. Such angle $\beta$ is essentially equal to $n\theta/M$. Typically, $\theta$ is 7.8° and M is 8.3; n is the index of refraction of the optical medium between the CRT outside surface 23 and a rear optical surface 13 of the lens assembly 12. Rotation of the CRT through the angle $\beta$ moves the plane 15 in a direction of an arrow 10C into registration with the surface 10A.

To achieve precisely and to maintain accurately the scheimpflug angle, a tilt correction member 30 is disposed between and fixed on the CRT and the lens assembly. The member 30 is solid (i.e. without cavities) and consists essentially of a hard transparent material capable of being easily, accurately molded and machined, and of reliably maintaining its shape. A suitable glass or a suitable plastic may be used. An acrylic plastic having an refractive index of 1.49 is particularly desirable. Preferably, the member has an index of refraction which is uniform throughout and which is approximately equal to the index of refraction of the lens rear surface 13 (typically consisting essentially of an acrylic plastic) in order to minimize reflection of light back to the CRT.

Figure 2:
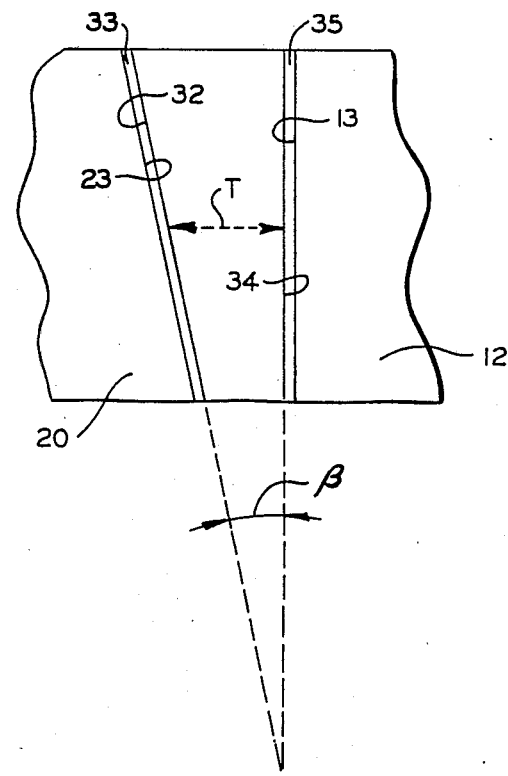
FIG. 2 is a schematic top plan view of the correction member of FIG. 1.

As shown in FIG. 2, the member 30 includes a CRT locating surface 32 and a lens assembly locating surface 34. The locating surfaces 32, 34 are planar and are oriented such that their planes intersect at the scheimpflug angle $\beta$. The member 30 should have a particular center thickness T (measured from a point at the center of the plane 32 to a point at the center of the plane 34). However, the thickness T is not critical because of focusing adjustment means (not shown) provided with most lens assemblies 12. Thickness T preferably is such that, when the member is fixed on the lens and on the CRT in accordance with the instant invention, the center point 22B of the phosphor screen 22 is located at the appropriate conjugate point for the center point 10B of the screen projection surface 10A. As heretofore stated, such location takes into account all optical media (e.g. faceplate, correction member) through which light emitted from the phosphor screen 22 must travel to reach the lens 12.

The lens locating surface 34 is fixed on the lens rear optical surface 13 by means of a uniformly thin layer 35 (e.g. several tenths mm.) of an optical cement such as any suitable silicone based optical cement (e.g. "RTV" rubber) having an index of refraction (e.g. 1.5) approximately equal to that of the lens rear surface 13. Cathode-ray tube 14 is fixed on the CRT locating surface 32 conveniently by a uniformly thin layer 33 of an identical or a similar optical cement. The layers 33, 35 should extend over the entire respective surfaces 32, 34.

Alternatively, the CRT may be fixed on the surface 32 by means of any conventional holding assembly (not shown) such as by suitable flanges provided on the tube, and by holding arms pivotally mounted to the flanges. Each holding arm may have a thumbscrew at its end remote from a respective flange so that the thin bodies of the screws may slip through slots provided in flanges of a housing of the lens assembly. Tightening the thumbscrews causes the CRT surface 23 to be fixed on the member surface 32.

A uniformly thin layer 33 (e.g. several tenths mm.) of an optical grease should be provided between the CRT surface 23 and the CRT locating surface 32 when not using an optical cement or other optical adhesive between the surfaces 23, 32. The grease minimizes reflections back to the CRT. A suitable optical grease is silicone grease "G688" manufactured by the General Electric Company.

Member 30 can be manufactured by techniques well known to manufacturers of precisely shaped products such as optical lenses. For example, member 30 may be suitably molded, and then machined until the planes of the locating surfaces 32, 34 intersect at the desired Scheimpflug angle.

TYPICAL PREFERRED EMBODIMENT

Referring to FIG. 3, there is shown a projection TV system including a liquid cooled cathode-ray tube 14 which may be a commercially available tube (Hitachi Model No. 180ACB22). Such a tube comprises a phosphor screen 22 (approximately 5" diagonal) located on a planar inside surface of a glass faceplate 20 which has a planar outside surface 23 (approximately 7" diagonal). A glass containment plate 50 is spaced from the glass faceplate to form a channel 40 between them; an ethylene glycol/H$_2$O (80/20 by weight) cooling liquid fills the channel 40. The tube is suitably housed (not shown) to retain the cooling liquid in the channel 40 and to provide for a thermal transfer between the liquid and the ambient atmosphere.

The CRT elements have the following thicknesses and refractive indexes:
faceplate: 7 millimeters, n=1.5;
cooling liquid: 3.2 millimeters, n=1.41;
containment plate: 5 millimeters, n=1.5.

The outside surface of the front portion of the tube 14, in this case, consists of a flat outside surface 52 (approximately 7" diagonal) of the containment plate 50. Surface 52 is fixed on a planar CRT locating surface 32 (approximately 7" diagonal) of a correction member 30 by means of a suitable silicone based cement (n=1.5). Member 30 is formed integrally with rear element C of a compound lens assembly 12.

The lens 12, except for the rear lens element C, may be a commercially available projection TV lens (model: Compact Delta 1) manufactured by U.S. Precision Lens Incorporated of Cincinnati, Ohio. Such a compound lens comprises a planoconcave rear element C (field flattener element) spaced from two mutually spaced bi-convex elements A, B (power elements) which are movable as a unit with respect to the rear element C. The elements A, B, C are formed of an acrylic plastic having an index of refraction approximately equal to 1.49.

In such a system wherein a distance D (from apex of convex element A to point 10B) is 43 inches, the lens has a focal length f equal to 115 mm. and a magnification M equal to 8.3, and the acute angle $\theta$ equals 7.8", then the Scheimpflug angle $\theta$ is 1.4°. Also, the central thickness T of the correction member 30 is 8.4 millimeters, while the central thickness of the remainder of the element C (along optical axis 12A) is 3 mm.

While there has been shown and described what is present considered the preferred embodiments of the present invention, various changes and modifications may be made therein without departing from the spirit and scope of the invention as defined by the appended claims.

For example, the projection system may include a liquid cooled CRT whose faceplate has an outside surface which is curved (e.g. concave) in a direction towards the electron gun, and has an inside screen surface which is parallel to the curved outside surface.

What is claimed is:
1. A projection television system, comprising:
a projection screen including a substantially planar projection surface, the projection screen defining an axis normal to the projection surface;
source means for producing an optical image, the source means including a front portion having a planar outside surface;
lens means for focusing the optical image onto the projection screen, the lens means being arranged such that the lens means and the source means, together, project the optical image onto the projection screen, the lens means having an optical axis and being further arranged such that the optical axis is skewed with respect to the axis normal to the projection surface of the projection screen, the lens means including a flat rear optical surface oriented perpendicularly to the optical axis, and
a transparent correction member having a source means locating surface and a lens means locating surface, the locating surfaces being planar and oriented such that the locating surface planes intersect at a Scheimpflug angle of the system, the outside surface being arranged parallel to and being fixed on the source means locating surface; the rear optical surface being arranged parallel to and being fixed on the lens means locating surface, whereby the respective planes of the outside surface and the rear optical surface intersect at the Scheimpflug angle so that the focused image plane of the projected optical image registers with the projection surface of the screen.

2. A system as claimed in claim 1, further comprising a thin layer of an optical grease disposed between the planar outside surface and the source means locating surface.

3. A system as claimed in claim 2, wherein the transparent correction member consists essentially of a hard material having an index of refraction equal to approximately 1.49.

4. A system as claimed in claim 2, wherein the source means comprises a cathode-ray tube of the monochrome type having a front portion including a generally planar phosphor screen arranged such that the phosphor screen is parallel to the planar outside surface.

5. A system as claimed in claim 4, wherein the front portion of the source means further includes:
- a faceplate arranged adjacent to the phosphor screen of the cathode-ray tube;
- a containment plate spaced from the faceplate so that the faceplate and the containment plate form a channel therebetween, the containment plate having a flat outside surface, the planar outside surface of the front portion consisting of the flat outside surface of the containment plate, and
- a liquid for cooling the faceplate during normal operation of the cathode-ray tube, the liquid being disposed in 6. A projection television system, comprising:
- a projection screen including a substantially planar projection surface, the screen defining an axis normal to the projection surface;
- a cathode ray tube including: an electron gun for generating an electron beam, the gun defining an electron beam axis; a front portion having an inside screen surface and an outside surface, the inside and outside surfaces being planar and being oriented perpendicularly to the electron beam axis, and a phosphor screen located on the inside screen surface so that, during normal operation of the tube, the electron beam impinges upon the phosphor screen to produce a phosphor image;
- lens means, located near the outside surface, for focusing the phosphor image onto the projection screen, the lens means being arranged such that the lens means and the source means, together, project the optical image onto the projection screen, the lens means having an optical axis and an image magnification M, the lens means being arranged such that the optical axis is tilted at a first acute angle $\theta$ with respect to the axis normal to the projection surface of the projection screen,
- the lens means further comprising a rear lens element of refractive index n and having a planar cathode ray tube locating surface at a second acute angle $\beta$ to a plane perpendicular to the optical axis, where $\beta = \theta n/M$, the cathode ray tube locating surface being fixed to the outer surface of the cathode ray tube, whereby the electron beam axis intersects the optical axis at second acute angle $\beta$.

7. A projection television system comprising a projection screen, a cathode ray tube, and a compound lens system defining an optical axis, said optical axis being skewed from an axis normal to the projection screen at a first acute angle, characterized in that the lens system comprises a rear lens element having a planar surface disposed at a second acute angle to a plane perpendicular to the optical axis, wherein said second acute angle is the Scheimpflug angle for the system, said cathode ray tube having an outer surface which is fixed parallel to the planar surface of the rear leans element with a medium of like refractive index therebetween.

* * * * *

UNITED STATES PATENT AND TRADEMARK OFFICE
CERTIFICATE OF CORRECTION

PATENT NO. : 4,672,458

DATED : June 9, 1987

INVENTOR(S) : Thomas S. McKechnie

It is certified that error appears in the above-identified patent and that said Letters Patent is hereby corrected as shown below:

IN THE CLAIMS

Claim 5, line 13   after "in" insert --the channel.--

Signed and Sealed this

Thirteenth Day of December, 1988

Attest:

DONALD J. QUIGG

*Attesting Officer*   *Commissioner of Patents and Trademarks*